United States Patent
Stawovy et al.

(10) Patent No.: US 11,389,872 B2
(45) Date of Patent: *Jul. 19, 2022

(54) TUNGSTEN HEAVY METAL ALLOY POWDERS AND METHODS OF FORMING THEM

(71) Applicants: Michael T. Stawovy, Cleveland Heights, OH (US); Scott D. Ohm, Coldwater, MI (US); Fahrron C. Fill, Bronson, MI (US)

(72) Inventors: Michael T. Stawovy, Cleveland Heights, OH (US); Scott D. Ohm, Coldwater, MI (US); Fahrron C. Fill, Bronson, MI (US)

(73) Assignee: H.C. Starck Solutions Euclid, LLC, Euclid, OH (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/022,281

(22) Filed: Sep. 16, 2020

(65) Prior Publication Data

US 2021/0060653 A1    Mar. 4, 2021

Related U.S. Application Data

(63) Continuation of application No. 15/835,519, filed on Dec. 8, 2017, now Pat. No. 10,807,168.

(Continued)

(51) Int. Cl.
*B22F 9/02* (2006.01)
*B22F 9/04* (2006.01)
(Continued)

(52) U.S. Cl.
CPC .............. *B22F 9/04* (2013.01); *B22F 1/10* (2022.01); *B22F 1/148* (2022.01); *B22F 9/026* (2013.01); *B22F 9/082* (2013.01); *B22F 10/00* (2021.01); *B22F 10/20* (2021.01); *B33Y 70/00* (2014.12); *C22C 27/04* (2013.01); *B22F 1/103* (2022.01); *B22F 3/10* (2013.01); *B22F 3/1021* (2013.01); *B22F 2009/041* (2013.01); *B22F 2201/013* (2013.01); *B22F 2202/13* (2013.01); *B22F 2207/13* (2013.01); *B22F 2207/17* (2013.01); *B22F 2301/10* (2013.01);
(Continued)

(58) Field of Classification Search
None
See application file for complete search history.

(56) References Cited

U.S. PATENT DOCUMENTS

| 3,979,209 A | 9/1976 | Snyder, Jr. |
| 4,324,588 A | 4/1982 | Zysk |

(Continued)

FOREIGN PATENT DOCUMENTS

EP      0325179      7/1989

OTHER PUBLICATIONS

PCT International Patent Application No. PCT/US2017/065224, International Search Report and Written Opinion dated Mar. 27, 2018, 16 pages.

*Primary Examiner* — George Wyszomierski
(74) *Attorney, Agent, or Firm* — Morgan, Lewis & Bockius LLP

(57) ABSTRACT

In various embodiments, metallic alloy powders are formed at least in part by spray drying to form agglomerate particles and/or plasma densification to form composite particles.

21 Claims, 8 Drawing Sheets

Related U.S. Application Data

(60) Provisional application No. 62/432,080, filed on Dec. 9, 2016.

(51) Int. Cl.

| | | |
|---|---|---|
| *B33Y 70/00* | (2020.01) | |
| *B22F 10/20* | (2021.01) | |
| *B22F 10/00* | (2021.01) | |
| *B22F 1/10* | (2022.01) | |
| *B22F 1/148* | (2022.01) | |
| *B22F 9/08* | (2006.01) | |
| *C22C 27/04* | (2006.01) | |
| *B22F 3/10* | (2006.01) | |
| *B33Y 10/00* | (2015.01) | |
| *C22C 1/04* | (2006.01) | |
| *B22F 1/103* | (2022.01) | |

(52) U.S. Cl.
CPC ....... *B22F 2301/15* (2013.01); *B22F 2301/20* (2013.01); *B22F 2301/35* (2013.01); *B22F 2999/00* (2013.01); *B33Y 10/00* (2014.12); *C22C 1/045* (2013.01)

(56) References Cited

U.S. PATENT DOCUMENTS

| | | | |
|---|---|---|---|
| 4,415,635 A | 11/1983 | Wilsdorf | |
| 4,777,015 A | 10/1988 | Kemp, Jr. et al. | |
| 5,008,071 A | 4/1991 | Spencer | |
| 5,821,441 A | 10/1998 | Kawamura | |
| 8,268,035 B2 | 9/2012 | Myers | |
| 10,807,168 B2* | 10/2020 | Stawovy | B22F 9/082 |
| 11,179,780 B2* | 11/2021 | Stawovy | B22F 10/20 |
| 2002/0033548 A1 | 3/2002 | Brodkin et al. | |
| 2004/0177720 A1* | 9/2004 | Shaner | F42B 12/74 75/248 |
| 2005/0155680 A1 | 7/2005 | Nagy | |
| 2006/0165546 A1 | 7/2006 | Yamada et al. | |
| 2013/0327571 A1* | 12/2013 | Andrzejak | F42B 1/032 175/2 |
| 2015/0239045 A1 | 8/2015 | Aslund et al. | |
| 2016/0289468 A1 | 6/2016 | Turner | |
| 2017/0175234 A1 | 7/2017 | Jennett | |
| 2017/0209908 A1 | 7/2017 | Smathers | |
| 2018/0161883 A1 | 6/2018 | Stawovy et al. | |
| 2019/0381564 A1* | 12/2019 | Barnes | B22F 9/04 |
| 2020/0276639 A1* | 9/2020 | Leichtfried | C22C 1/045 |

* cited by examiner

US 11,389,872 B2

TUNGSTEN HEAVY METAL ALLOY POWDERS AND METHODS OF FORMING THEM

RELATED APPLICATION

This application is a continuation of U.S. patent application Ser. No. 15/835,519, filed Dec. 8, 2017, now issued as U.S. Pat. No. 10,807,168 on Oct. 20, 2020, which claims the benefit of and priority to U.S. Provisional Patent Application No. 62/432,080, filed Dec. 9, 2016, the entire disclosure of each of which is hereby incorporated herein by reference.

TECHNICAL FIELD

In various embodiments, the present invention relates to metal powders and the formation thereof, and in particular to metal powders including at least one refractory metal.

BACKGROUND

Additive manufacturing, or three-dimensional (3D) printing, is a widely utilized technique for rapid manufacturing and rapid prototyping. In general, additive manufacturing involves the layer-by-layer deposition of material by computer control to form a three-dimensional object. Most additive manufacturing techniques to date have utilized polymeric or plastic materials as raw materials, as such materials are easily handled and melt at low temperatures. While various techniques have been utilized for the additive manufacturing of metallic parts, metallic precursor materials present a host of challenges, particularly when the desired material is an alloy or mixture of different elemental metals. Conventional techniques, when utilized with metallic precursor materials, may result in parts of inadequate density or that do not meet ASTM specifications. Thus, there is a need for techniques for the preparation of metallic alloy precursors (e.g., in the form of powders) which, when utilized with suitable additive manufacturing techniques, result in the formation of a highly densified metallic part.

SUMMARY

In accordance with various embodiments of the present invention, a precursor material including, consisting essentially of, or consisting of a metallic alloy is formed as a highly flowable, highly dense powder of composite particles that is suitable for additive manufacturing. In various embodiments, an initial powder is prepared by blending powders of the various elemental metal constituents of the desired metal alloy together. A slurry is formed by mixing the powder blend with one or more liquids (e.g., water and/or one or more organic binders), and then the slurry is spray-dried to produce flowable agglomerate particles (i.e., particles each including, consisting essentially of, or consisting of a mixture or alloy of the precursor metals, rather than each particle being composed of a single elemental metal as in the initial powder blend). The agglomerate is thermally heated (i.e., sintered) to remove any organic material and to densify the agglomerate. In some embodiments of the invention, the agglomerate particles may be plasma densified in order to further increase their density. The resulting densified composite particles are highly flowable (e.g., as measured with a Hall flowmeter), thereby enabling the powder to be reliably fed through a powder feeder and/or spread uniformly over a powder bed for additive manufacturing. The composite particles in accordance with embodiments of the invention also have a high density, which minimizes shrinkage (i.e., volume reduction) during subsequent melting and/or sintering processes. High-density powder utilized in a powder bed may also improve thermal conductivity of the powder bed. In some embodiments, the powder of composite particles has a density of approximately 35%-approximately 65% of the theoretical density of the target metallic alloy. The composite particles also have low (e.g., non-zero) concentrations of, or are substantially free of, interstitial and surface contaminants, the presence of which may compromise the mechanical properties of the final 3D-printed part (e.g., lead to increased porosity).

In accordance with embodiments of the invention, the alloy composite particles are utilized to form a 3D part by additive manufacturing. In an exemplary embodiment, a printing head is utilized to disperse a liquid binder or adhesive (typically a polymer material) into a powder bed of the composite particles layer-by-layer in approximately the desired shape and size for the part. After each layer, the binder may be cured by, e.g., application of heat or light. After the printing is complete, the shaped, 3D part is made of the composite particles held together by the binder material. The shaped part may then be sintered to fuse the particles together and decompose (i.e., burn off) some or all of the binder material and possibly leave empty pores (if desired; such pores may subsequently be infiltrated with another material by placing the shaped part in contact with the material and heat treating the article such that the material infiltrates into the pores of the shaped part).

As utilized herein, the term "substantially spherical" means spherical to within ±10%, and in some embodiments, ±5% in any direction—i.e., the eccentricity in any direction does not exceed 5% or 10%. As utilized herein, "non-spherical" means elongated with an aspect ratio of at least 2:1, acicular, having at least one flat surface (e.g., a flake with two opposed flat surfaces), having at least one corner or vertex, or polyhedral.

In an aspect, embodiments of the invention feature a powder for additive manufacturing of a part that includes, consists essentially of, or consists of a tungsten heavy alloy. The tungsten heavy alloy includes, consists essentially of, or consists of approximately 90% or more tungsten and 10% or less (or between approximately 1% and approximately 10%, or between approximately 0.5% and approximately 10%) of one or more additional elements selected from the group consisting of nickel, iron, copper, cobalt, and manganese, and may also include trace amounts of impurities. For example, the concentrations of elements such as oxygen (O), sodium (Na), magnesium (Mg), phosphorus (P), sulfur (S), potassium (K), calcium (Ca), and/or antimony (Sb) may be present at a level below a concentration of 20 ppm, below a concentration of 10 ppm, below a concentration of 5 ppm, below a concentration of 3 ppm, below a concentration of 2 ppm, or even below a concentration of 1 ppm, and may be present at a concentration of at least 0.01 ppm, at least 0.05 ppm, at least 0.1 ppm, or even at least 0.2 ppm (all concentrations herein are by weight unless otherwise indicated). The tungsten heavy alloy has a theoretical density corresponding to a weighted average of the densities of tungsten and the one or more additional elements. The powder includes, consists essentially of, or consists of a plurality of substantially spherical composite particles. Each composite particle includes, consists essentially of, or consists of a plurality of tungsten grains surrounded by a matrix including, consisting essentially of, or consisting of at least one of the one or more additional elements. The bulk density of the powder may be approximately 35% or more of the theoretical density. The bulk density of the powder may be approximately 80% or less of the theoretical density. The tap density of the powder may range from approximately 40% to approximately 75% of the theoretical density.

Embodiments of the invention may include one or more of the following in any of a variety of combinations. The Hall flow rate of the powder may range from approximately 1 s/50 g to approximately 15 s/50 g. The powder may have a particle-size distribution d10 between 2 microns and 8 microns, d50 between 15 microns and 25 microns, and d90 between 50 microns and 70 microns, where a particle-size distribution dX of Y denotes that X% of particles have a size less than Y. The bulk density of the powder may be approximately 45% or more of the theoretical density. The bulk density of the powder may be approximately 50% or more of the theoretical density. The bulk density of the powder may be approximately 65% or less of the theoretical density.

In another aspect, embodiments of the invention feature a method of forming a powder that includes, consists essentially of, or consists of a tungsten heavy alloy. The tungsten heavy alloy (i) includes, consists essentially of, or consists of 90% or more tungsten and 10% or less of one or more additional elements selected from the group consisting of nickel, iron, copper, cobalt, and manganese, and (ii) has a theoretical density corresponding to a weighted average of the densities of tungsten and the one or more additional elements. A powder blend is formed by blending together powders of tungsten and the one or more additional elements. Each powder may be an elemental metal powder consisting essentially of or consisting of tungsten or one of the other elements. A slurry is formed by mixing at least a portion of the powder blend with a liquid. The liquid includes, consists essentially of, or consists of water and/or one or more organic binders. At least a portion of the slurry and a heated gas are sprayed into a drying chamber to form a plurality of agglomerate particles each including, consisting essentially of, or consisting of a mixture of tungsten and at least one of the one or more additional elements. At least some of the agglomerate particles are densified to form the powder. The densification includes, consists essentially of, or consists of heating to a temperature greater than a melting point of at least one of the additional elements and less than a melting point of tungsten. The powder includes, consists essentially of, or consists of a plurality of substantially spherical composite particles, each composite particle including, consisting essentially of, or consisting of a plurality of tungsten grains surrounded by a matrix including, consisting essentially of, or consisting of at least one of the one or more additional elements.

Embodiments of the invention may include one or more of the following in any of a variety of combinations. The densification may include, consist essentially of, or consist of feeding the at least a portion of the plurality of agglomerate particles through a plasma. The Hall flow rate of the powder may range from approximately 1 s/50 g to approximately 15 s/50 g. The powder may have a particle-size distribution d10 between 2 microns and 8 microns, d50 between 15 microns and 25 microns, and d90 between 50 microns and 70 microns, where a particle-size distribution dX of Y denotes that X% of particles have a size less than Y. The bulk density of the powder may be approximately 45% or more of the theoretical density. The bulk density of the powder may be approximately 50% or more of the theoretical density. The bulk density of the powder may be approximately 65% or less of the theoretical density.

In yet another aspect, embodiments of the invention feature a powder for additive manufacturing of a part that includes, consists essentially of, or consists of a metallic alloy containing one or more refractory metals and one or more transition metals having a melting point less than that of the one or more refractory metals. The alloy may include, consist essentially of, or consist of 60% or more, 70% or more, 80% or more, or 90% or more of the one or more refractory metals and 40% or less, 30% or less, 20% or less, or 10% or less of the one or more transition metals, and may also include trace amounts of impurities. For example, the concentrations of elements such as O, Na, Mg, P, S, K, Ca, and/or Sb may be present at a level below a concentration of 20 ppm, below a concentration of 10 ppm, below a concentration of 5 ppm, below a concentration of 3 ppm, below a concentration of 2 ppm, or even below a concentration of 1 ppm, and may be present at a concentration of at least 0.01 ppm, at least 0.05 ppm, at least 0.1 ppm, or even at least 0.2 ppm (all concentrations herein are by weight unless otherwise indicated). The metal alloy has a theoretical density corresponding to a weighted average of the densities of the one or more refractory metals and the one or more transition metals. The powder includes, consists essentially of, or consists of a plurality of substantially spherical composite particles. Each composite particle includes, consists essentially of, or consists of a plurality of grains surrounded by a matrix including, consisting essentially of, or consisting of at least one of the one or more transition metals. The grains include, consist essentially of, or consist of at least one of the one or more refractory metals. The bulk density of the powder may be approximately 35% or more of the theoretical density. The bulk density of the powder may be approximately 80% or less of the theoretical density. The tap density of the powder may range from approximately 40% to approximately 75% of the theoretical density.

Embodiments of the invention may include one or more of the following in any of a variety of combinations. The Hall flow rate of the powder may range from approximately 1 s/50 g to approximately 15 s/50 g. The powder may have a particle-size distribution d10 between 2 microns and 8 microns, d50 between 15 microns and 25 microns, and d90 between 50 microns and 70 microns, where a particle-size distribution dX of Y denotes that X% of particles have a size less than Y. The bulk density of the powder may be approximately 45% or more of the theoretical density. The bulk density of the powder may be approximately 50% or more of the theoretical density. The bulk density of the powder may be approximately 65% or less of the theoretical density.

In another aspect, embodiments of the invention feature a method of forming a powder that includes, consists essentially of, or consists of a metallic alloy containing one or more refractory metals and one or more transition metals having a melting point less than that of the one or more refractory metals. The alloy may include, consist essentially of, or consist of 60% or more, 70% or more, 80% or more, or 90% or more of the one or more refractory metals and 40% or less, 30% or less, 20% or less, or 10% or less of the one or more transition metals, and may also include trace amounts of impurities. For example, the concentrations of elements such as O, Na, Mg, P, S, K, Ca, and/or Sb may be present at a level below a concentration of 20 ppm, below a concentration of 10 ppm, below a concentration of 5 ppm, below a concentration of 3 ppm, below a concentration of 2 ppm, or even below a concentration of 1 ppm, and may be present at a concentration of at least 0.01 ppm, at least 0.05 ppm, at least 0.1 ppm, or even at least 0.2 ppm (all concentrations herein are by weight unless otherwise indicated). The metal alloy has a theoretical density corresponding to a weighted average of the densities of the one or more refractory metals and the one or more transition metals. A powder blend is formed by blending together powders of the one or more refractory metals and the one or more transition metals. Each powder may be an elemental metal powder consisting essentially of or consisting of one of the refractory metals or one of the transition metals. A slurry is formed by mixing at least a portion of the powder blend with a liquid. The liquid includes, consists essentially of, or consists of water and/or one or more organic binders. At least a portion of the slurry and a heated gas are sprayed into a drying chamber to form a plurality of agglomerate particles each including, consisting essentially of, or consisting of a mixture of the one or more refractory metals and the one or more transition metals. At least some of the agglomerate particles are densified to form the powder. The densification includes, consists essentially of, or consists of heating to a temperature greater than a melting point of at least one (or even all) of the transition metals and less than a melting point of at least one (or even all) of the refractory metals. The powder includes, consists essentially of, or consists of a plurality of substantially spherical composite particles, each composite particle including, consisting essentially of, or consisting of a plurality of grains surrounded by a matrix including, consisting essentially of, or consisting of at least one of the one or more transition metals. The grains include, consist essentially of, or consist of at least one of the one or more refractory metals.

Embodiments of the invention may include one or more of the following in any of a variety of combinations. The densification may include, consist essentially of, or consist of feeding the at least a portion of the plurality of agglomerate particles through a plasma. The Hall flow rate of the powder may range from approximately 1 s/50 g to approximately 15 s/50 g. The powder may have a particle-size distribution d10 between 2 microns and 8 microns, d50 between 15 microns and 25 microns, and d90 between 50 microns and 70 microns, where a particle-size distribution dX of Y denotes that X% of particles have a size less than Y. The bulk density of the powder may be approximately 45% or more of the theoretical density. The bulk density of the powder may be approximately 50% or more of the theoretical density. The bulk density of the powder may be approximately 65% or less of the theoretical density.

In another aspect, embodiments of the invention feature a method of fabricating a three-dimensional object that includes, consists essentially of, or consists of a metallic alloy including, consisting essentially of, or consisting of a plurality of constituent metals (e.g., elemental metals). A powder blend is formed by blending together powders of each of the constituent metals. A slurry is formed by mixing the powder blend with a liquid, the liquid comprising water and/or one or more organic binders. The slurry and one or more heated gases are sprayed into a drying chamber to form a plurality of agglomerate particles each including, consisting essentially of, or consisting of a mixture of the plurality of constituent metals. A powder bed containing the particles is provided. A first layer of a shaped part is formed by (i) dispersing a binder into the powder bed, and (ii) curing the binder. The first layer of the shaped part includes, consists essentially of, or consists of particles bound together by cured binder. A layer of the particles is disposed or dispersed over the first layer of the shaped part. Subsequent layers of the shaped part are formed by (i) dispersing binder over the particles, and (ii) curing the binder, additional particles being disposed over the shaped part between layers. The shaped part is sintered to burn away at least a portion (or even substantially all) of the cured binder to form the three-dimensional object.

Embodiments of the invention may include one or more of the following in any of a variety of combinations. At least some of the plurality of agglomerate particles may be densified (e.g., by plasma densification) prior to forming the shaped part to form composite particles. Some or all of the particles provided in the powder bed may be composite particles. Each of the composite particles may include, consist essentially of, or consist of a plurality of grains surrounded by a matrix. The grains may include, consist essentially of, or consist of one or more of the metals (e.g., the one or more metals having the highest melting points), and the matrix may include, consist essentially of, or consist of one or more of the others of the metals (e.g., the one or more metals having the lowest melting points). The grains may include, consist essentially of, or consist of one or more refractory metals. The matrix may include, consist essentially of, or consist of one or more transition metals. The grains may include, consist essentially of, or consist of tungsten. The matrix may include, consist essentially of, or consist of one or more of nickel, iron, copper, cobalt, or manganese. The alloy may include, consist essentially of, or consist of 60% or more, 70% or more, 80% or more, or 90% or more of the one or more refractory metals and 40% or less, 30% or less, 20% or less, or 10% or less of the one or more transition metals, and may also include trace amounts of impurities. For example, the concentrations of elements such as O, Na, Mg, P, S, K, Ca, and/or Sb may be present at a level below a concentration of 20 ppm, below a concentration of 10 ppm, below a concentration of 5 ppm, below a concentration of 3 ppm, below a concentration of 2 ppm, or even below a concentration of 1 ppm, and may be present at a concentration of at least 0.01 ppm, at least 0.05 ppm, at least 0.1 ppm, or even at least 0.2 ppm (all concentrations herein are by weight unless otherwise indicated). The alloy may include, consist essentially of, or consist of 60% or more, 70% or more, 80% or more, or 90% or more of tungsten and 40% or less, 30% or less, 20% or less, or 10% or less of one or more of nickel, iron, copper, cobalt, or manganese, and may also include trace amounts of impurities. The shaped part may be sintered in an atmosphere or ambient that includes, consists essentially of, or consists of hydrogen (e.g., a mixture of hydrogen and nitrogen). The shaped part may be sintered at a temperature ranging between approximately 1400° C. and approximately 1500° C. During formation of each layer of the shaped part, the binder may be cured via application of light and/or heat.

In yet another aspect, embodiments of the invention feature a method of fabricating a three-dimensional object that includes, consists essentially of, or consists of a metallic alloy including, consisting essentially of, or consisting of a plurality of constituent metals (e.g., elemental metals). A powder bed containing particles is provided. The particles each include, consist essentially of, or consist of a mixture or alloy of two or more (or even all) of the constituent metals. The particles are formed at least in part by spray drying of a slurry containing a blend of powders of each of the constituent metals. A first layer of a shaped part is formed by (i) dispersing a binder into the powder bed, and (ii) curing the binder. The first layer of the shaped part includes, consists essentially of, or consists of particles bound together by cured binder. A layer of the particles is disposed or dispersed over the first layer of the shaped part. Subsequent layers of the shaped part are formed by (i) dispersing binder over the particles, and (ii) curing the binder, additional particles being disposed over the shaped part between layers. The shaped part is sintered to burn away at least a portion (or even substantially all) of the cured binder to form the three-dimensional object.

Embodiments of the invention may include one or more of the following in any of a variety of combinations. The particles may be formed in part by densification (e.g., plasma densification) after spray drying. Each of the particles may include, consist essentially of, or consist of a plurality of grains surrounded by a matrix. The grains may include, consist essentially of, or consist of one or more of the metals (e.g., the one or more metals having the highest melting points), and the matrix may include, consist essentially of, or consist of one or more of the others of the metals (e.g., the one or more metals having the lowest melting points). The grains may include, consist essentially of, or consist of one or more refractory metals. The matrix may include, consist essentially of, or consist of one or more transition metals. The grains may include, consist essentially of, or consist of tungsten. The matrix may include, consist essentially of, or consist of one or more of nickel, iron, copper, cobalt, or manganese. The alloy may include, consist essentially of, or consist of 60% or more, 70% or more, 80% or more, or 90% or more of the one or more refractory metals and 40% or less, 30% or less, 20% or less, or 10% or less of the one or more transition metals, and may also include trace amounts of impurities. For example, the concentrations of elements such as O, Na, Mg, P, S, K, Ca, and/or Sb may be present at a level below a concentration of 20 ppm, below a concentration of 10 ppm, below a concentration of 5 ppm, below a concentration of 3 ppm, below a concentration of 2 ppm, or even below a concentration of 1 ppm, and may be present at a concentration of at least 0.01 ppm, at least 0.05 ppm, at least 0.1 ppm, or even at least 0.2 ppm (all concentrations herein are by weight unless otherwise indicated). The alloy may include, consist essentially of, or consist of 60% or more, 70% or more, 80% or more, or 90% or more of tungsten and 40% or less, 30% or less, 20% or less, or 10% or less of one or more of nickel, iron, copper, cobalt, or manganese, and may also include trace amounts of impurities. The shaped part may be sintered in an atmosphere or ambient that includes, consists essentially of, or consists of hydrogen (e.g., a mixture of hydrogen and nitrogen). The shaped part may be sintered at a temperature ranging between approximately 1400° C. and approximately 1500° C. During formation of each layer of the shaped part, the binder may be cured via application of light and/or heat.

In another aspect, embodiments of the invention feature a method of fabricating a three-dimensional object that includes, consists essentially of, or consists of a metallic alloy including, consisting essentially of, or consisting of a plurality of constituent metals (e.g., elemental metals). A powder bed containing particles is provided. The particles each include, consist essentially of, or consist of a mixture and/or alloy of two or more (or even all) of the constituent metals. A first layer of a shaped part is formed by (i) dispersing a binder into the powder bed, and (ii) curing the binder. The first layer of the shaped part includes, consists essentially of, or consists of particles bound together by cured binder. A layer of the particles is disposed or dispersed over the first layer of the shaped part. Subsequent layers of the shaped part are formed by (i) dispersing binder over the particles, and (ii) curing the binder, additional particles being disposed over the shaped part between layers. The shaped part is sintered to burn away at least a portion (or even substantially all) of the cured binder to form the three-dimensional object.

Embodiments of the invention may include one or more of the following in any of a variety of combinations. At least some of the particles may be spray-dried agglomerate particles. At least some of the particles may be densified, substantially spherical composite particles. Each of the particles may include, consist essentially of, or consist of a plurality of grains surrounded by a matrix. The grains may include, consist essentially of, or consist of one or more of the metals (e.g., the one or more metals having the highest melting points), and the matrix may include, consist essentially of, or consist of one or more of the others of the metals (e.g., the one or more metals having the lowest melting points). The grains may include, consist essentially of, or consist of one or more refractory metals. The matrix may include, consist essentially of, or consist of one or more transition metals. The grains may include, consist essentially of, or consist of tungsten. The matrix may include, consist essentially of, or consist of one or more of nickel, iron, copper, cobalt, or manganese. The alloy may include, consist essentially of, or consist of 60% or more, 70% or more, 80% or more, or 90% or more of the one or more refractory metals and 40% or less, 30% or less, 20% or less, or 10% or less of the one or more transition metals, and may also include trace amounts of impurities. For example, the concentrations of elements such as O, Na, Mg, P, S, K, Ca, and/or Sb may be present at a level below a concentration of 20 ppm, below a concentration of 10 ppm, below a concentration of 5 ppm, below a concentration of 3 ppm, below a concentration of 2 ppm, or even below a concentration of 1 ppm, and may be present at a concentration of at least 0.01 ppm, at least 0.05 ppm, at least 0.1 ppm, or even at least 0.2 ppm (all concentrations herein are by weight unless otherwise indicated). The alloy may include, consist essentially of, or consist of 60% or more, 70% or more, 80% or more, or 90% or more of tungsten and 40% or less, 30% or less, 20% or less, or 10% or less of one or more of nickel, iron, copper, cobalt, or manganese, and may also include trace amounts of impurities. The shaped part may be sintered in an atmosphere or ambient that includes, consists essentially of, or consists of hydrogen (e.g., a mixture of hydrogen and nitrogen). The shaped part may be sintered at a temperature ranging between approximately 1400° C. and approximately 1500° C. During formation of each layer of the shaped part, the binder may be cured via application of light and/or heat.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be present in non-zero concentrations and/or detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
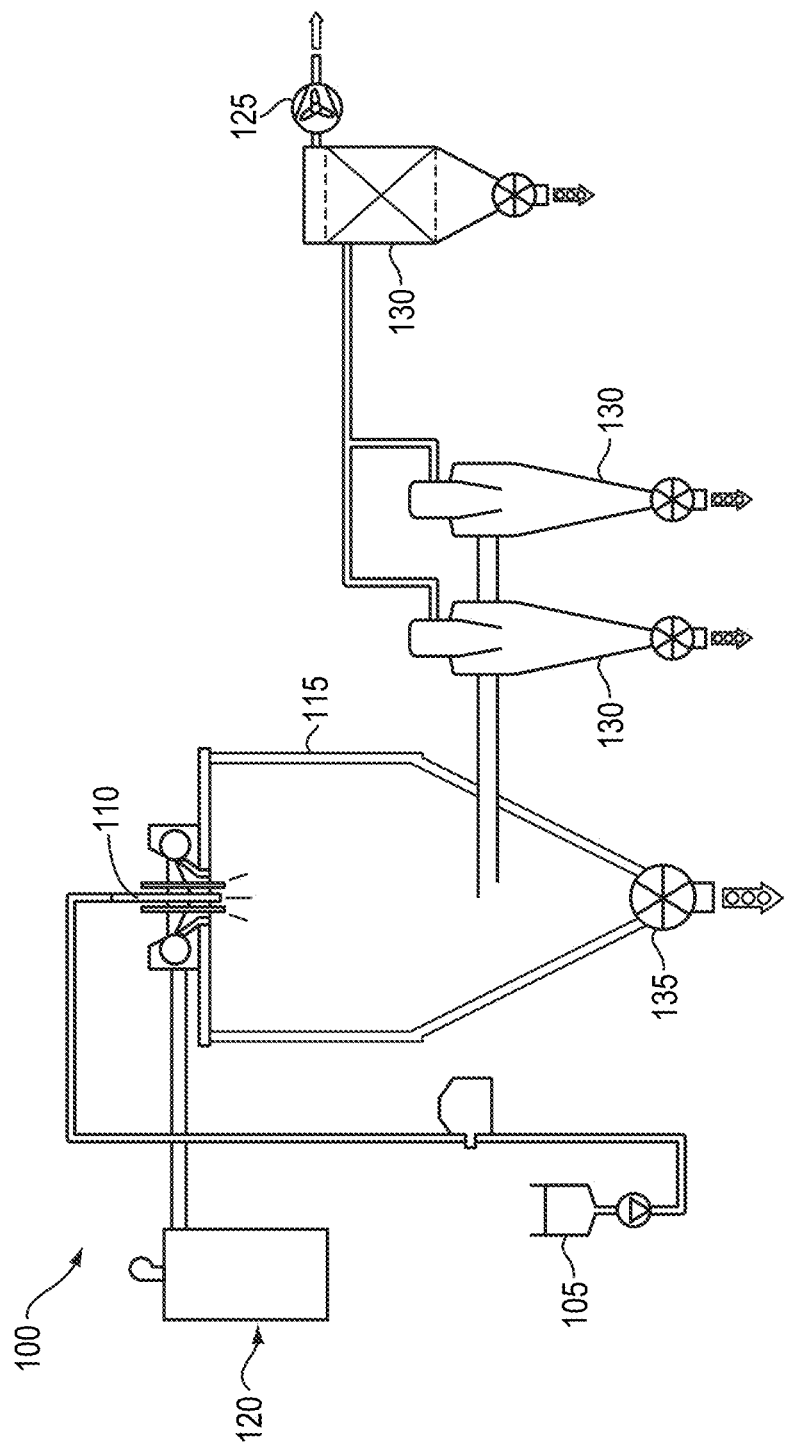
FIG. 1 is a schematic diagram of a spray drying apparatus utilized to form agglomerate particles in accordance with various embodiments of the invention.

The ensuing discussion focuses on tungsten heavy alloys as exemplary materials, but it should be understood that the invention has broad applicability to other metallic alloys, particularly those containing one or more refractory metals. For example, metallic alloys in accordance with embodiments of the invention include one or more refractory metals such as niobium (Nb), tantalum (Ta), rhenium (Re), tungsten (W), and/or molybdenum (Mo). Such alloys may also include one or more transition metals (e.g., one or more of copper (Cu), cobalt (Co), nickel (Ni), iron (Fe), manganese (Mn), silver (Ag), gold (Au), cadmium (Cd), vanadium (V), palladium (Pd), zirconium (Zr), or yttrium (Y)) and/or one or more other metals having a melting point lower than that of the one or more refractory metals.

In an exemplary embodiment, spray drying is utilized to form a collection (or "powder") of agglomerate particles that include, consist essentially of, or consist of a mixture of elements constituting a tungsten heavy alloy i.e., a mixture or alloy that includes more than approximately 90% tungsten (W) and also includes small amounts (e.g., approximately 1% to approximately 10%) of metal additives, e.g., one or more transition metals such as nickel (Ni), iron (Fe), copper (Cu), cobalt (Co), and/or manganese (Mn). Specific examples of tungsten heavy alloys include (all percentages are by weight unless otherwise indicated) (i) 90% W, 6% Ni, 4% Cu, (ii) 90% W, 7% Ni, 3% Fe, (iii) 92.5% W, 5.25% Ni, 2.25% Fe, (iv) 95% W, 3.5% Ni, 1.5% Cu, (v) 95% W, 3.5% Ni, 1.5% Fe, (vi) 97% W, 2.1% Ni, 0.9% Fe, (vii) 90% W, 5% Ni, 3% Fe, 2% Cu. As detailed herein, the spray-dried agglomerate particles may be advantageously densified by, e.g., plasma densification, to form composite particles that each includes, consists essentially of, or consists of a mixture and/or alloy of the mixture of elements within the agglomerate particles (and hence, within the initial powder blend).

While the composite particles each typically include, consist essentially of, or consist of a mixture of two or more (or even all) of the different elements of the desired alloy, the individual composite particles do not necessarily have the same composition. That is, in various embodiments there is a distribution of the compositions of the individual composite particles, but when considered as a large group, any compositional differences tend to average out to the desired alloy composition overall. In various embodiments of the invention, the composite particles each include, consist essentially of, or consist of a mixture of two or more elements, where a primary element is present at approximately 50% or more (e.g., approximately 70% or more, approximately 80% or more, or even approximately 90% or more) and has a melting point significantly higher than the melting points or one or more secondary elements, each of which are present at less than 50% (e.g., approximately 40% or less, approximately 30% or less, approximately 20% or less, approximately 10% or less, approximately 5% or less, approximately 2% or less, or even approximately 1% or less). For example, the melting point of the primary element may be at least approximately 400° C., at least approximately 700° C., or even at least approximately 1000° C. higher than the melting point of one or more of (or even all of) the secondary element(s).

In other embodiments, the composition of each of the composite particles is substantially equal to the composition of the desired target alloy (i.e., the composition of each composite particle is approximately the same as the overall composition of the collection of composite particles considered in volume).

In various embodiments of the invention, the powder of composite particles is highly flowable, as measured in accordance with ASTM B213-13, Standard Test Methods for Flow Rate of Metal Powders Using the Hall Flowmeter Funnel, ASTM International, West Conshohocken, Pa., 2013, the entire disclosure of which is incorporated by reference herein. In accordance therewith, an AS-300 Hall Flowmeter Funnel may be utilized to determine Hall flow rate by measuring the time taken by 50 grams of the powder to flow through the Hall flowmeter funnel. For example, in accordance with embodiments of the present invention, the alloy powder particles may have a Hall flow rate between approximately 5 s/50 g and approximately 50 s/50 g. In various embodiments, aggregate particles that have been spray dried but not densified may have a Hall flow rate between approximately 25 s/50 g and approximately 50 s/50 g. In various embodiments, densified composite particles that have been plasma densified may have a Hall flow rate between approximately 1 s/50 g and approximately 25 s/50 g, between approximately 1 s/50 g and approximately 15 s/50 g, between approximately 1 s/50 g and approximately 10 s/50 g, between approximately 2 s/50 g and approximately 10 s/50 g, or between approximately 5 s/50 g and approximately 10 s/50 g.

In various embodiments of the invention, the tap (or "tapped") density of the powder of composite particles is between approximately 25% and approximately 75% of the theoretical density of the material, as measured in accordance with ASTM B527-15, Standard Test Method for Tap Density of Metal Powders and Compounds, ASTM International, West Conshohocken, Pa., 2015, the entire disclosure of which is incorporated by reference herein. In various embodiments, the tap density of the composite particles is between approximately 35% and approximately 75% of the theoretical density of the material, or even between approximately 40% and approximately 70% of the theoretical density of the material. In various embodiments, the tap density of the composite particles is approximately 50% of the theoretical density of the material. In various embodiments, the tap density of the composite particles is between approximately 2% and approximately 10% larger than the bulk density of the composite particles, or between approximately 3% and approximately 8% larger than the bulk density of the composite particles, or between approximately 4% and approximately 7% larger than the bulk density of the composite particles, or approximately 5% larger than the bulk density of the composite particles.

In various embodiments of the invention, the composite particles also have low concentrations of interstitial impurities and surface contaminants. Such purity typically results in improved mechanical properties of the final printed part and reduced porosity from volatile compounds. For example, the composite particles may have oxygen concentrations less than approximately 1000 ppm, less than approximately 750 ppm, less than approximately 500 ppm, less than approximately 250 ppm, less than approximately 100 ppm, or less than approximately 50 ppm. The oxygen concentration may be non-zero, e.g., at least approximately 0.5 ppm, at least approximately 1 ppm, at least approximately 2 ppm, at least approximately 5 ppm, or at least approximately 10 ppm. The composite particles may also have carbon concentrations less than approximately 500 ppm, less than approximately 250 ppm, less than approximately 100 ppm, or less than approximately 50 ppm. The carbon concentration may be non-zero, e.g., at least approximately 0.5 ppm, at least approximately 1 ppm, at least approximately 2 ppm, at least approximately 5 ppm, or at least approximately 10 ppm. In various embodiments, densified composite particles are also substantially spherical after plasma densification.

In accordance with embodiments of the invention, a powder blend is initially formed by combining powders of the individual elemental metals of the desired alloy. The powder blend is then mixed with water and/or one or more organic binders to form a slurry. A dry powder is subsequently formed from the slurry. For example, the slurry may be spray dried to form agglomerate particles that each include, consist essentially of, or consist of the desired alloy (and/or a mixture of the elements within the alloy). An exemplary spray drying system 100 is shown in FIG. 1. As shown, the slurry is fed from a slurry feeder 105 to an atomizer or spray nozzle 110, which disperses the slurry into a drying chamber 115. A heat source 120 is utilized to heat air (and/or one or more other gases such as nitrogen and/or an inert gas such as argon) that is also introduced into the drying chamber 115 to dry the slurry. The drying gas flows out of the drying chamber 115, e.g., drawn out by suction caused by a pump or fan 125, and any dust is filtered out of the gas and collected at one or more dust collectors 130. The dry agglomerate particles exit the drying chamber 115 via a collection port 135 and are collected below the drying chamber 115. The particles may subsequently be screened and/or air classified to select particles of a specific size range.

Figure 2:
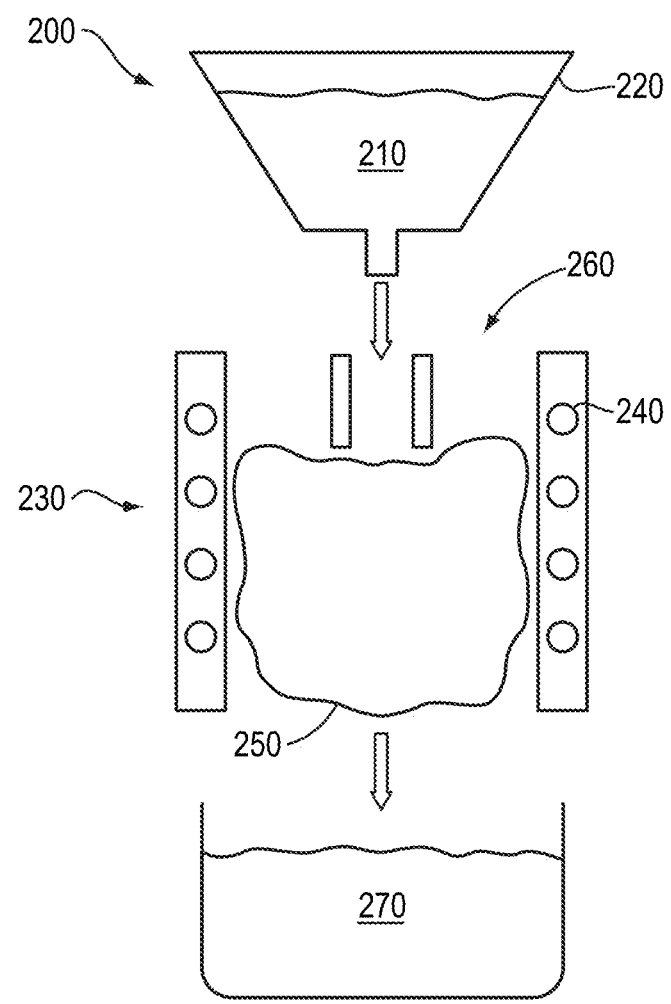
FIG. 2 is a schematic cross-sectional view of a plasma densification apparatus utilized to form substantially spherical densified powder particles in accordance with various embodiments of the invention.

In various embodiments of the invention, the spray-dried agglomerate particles are advantageously plasma densified for enhanced densification and/or shaping (i.e., to become substantially spherical). An exemplary apparatus 200 for plasma densification is shown schematically in FIG. 2. As shown, agglomerate powder particles 210 may be loaded into a powder feeder 220, which feeds the particles 210 through a plasma jet 230 formed by, for example, a time-varying current applied to an induction coil 240 sparking a plasma 250 from plasma gas 260 fed into the coil 240. The plasma jet 230 at least partially melts the particles 210, which subsequently resolidify into higher-density composite particles 270 collected below the plasma 250. The plasma-densified composite particles 270 are generally substantially spherical due to the plasma-induced melting and minimization of surface area resulting during resolidification. The minimization of the surface area of the particles also minimizes or substantially reduces the uptake of oxygen or other volatile species, and the plasma densification process itself volatilizes such species as well, thereby reducing the concentration of such contaminants within the powder 270. The plasma-densified composite powder particles 270 may have an average particle size of, for example, 15 μm to 45 μm, or even smaller.

In other embodiments, the composite powder particles may be formed via feeding the agglomerate powder particles through the plasma jet generated by a commercially available plasma torch. In various embodiments, this may enable lower-temperature formation of the composite particles, which may advantageously result in less or substantially no loss (i.e., due to vaporization) of lower-melting-point alloying elements in the powder particles during plasma densification. The operating temperature of the plasma torch may be decreased by, e.g., increasing the gas flow rate of the gas utilized to form the plasma, decreasing the operating current (or operating power), or use of a plasma-formation gas composed of more complex molecules (for example, use of a more complex gas molecule such as methane may result in lower plasma temperatures than use of a gas such as argon).

The table below presents various parameters of tungsten heavy metal alloy powders, comparing (1) a blend of the elemental powders, (2) spray-dried agglomerate, and (3) plasma-densified spray-dried agglomerate (i.e., densified composite particles). In this exemplary embodiment, the alloy contains 90% W, 5% Ni, 3% Fe, and 2% Cu (by weight) and has a theoretical bulk density of about 17.0 g/cc. In various embodiments, the plasma power of the plasma jet is reduced in order to avoid volatilization of one or more constituents of the alloy agglomerate particles, e.g., those elements having the lowest melting points. For example, these exemplary tungsten heavy metal alloy composite particles were plasma densified with a plasma power of about 28 kW, compared to a plasma power of 36 kW that is typically utilized to plasma densify molybdenum powder.

| Powder | Bulk Density (g/cc) | Hall Flow Rate (s/50 g) | Particle Size D10 (μm) | Particle Size D50 (μm) | Particle Size D90 (μm) |
|---|---|---|---|---|---|
| Blended | 4.0 | No Flow | 2.7 | 7.3 | 20.5 |

-continued

| Powder | Bulk Density (g/cc) | Hall Flow Rate (s/50 g) | Particle Size D10 (μm) | Particle Size D50 (μm) | Particle Size D90 (μm) |
|---|---|---|---|---|---|
| Spray Dried | 3.8 | 33 | 8.7 | 35.6 | 69.1 |
| Plasma Densified | 9.4 | 7 | 5.9 | 20.2 | 66.5 |

As shown, the blend of the elemental powders is not flowable and thus not suitable for additive manufacturing in accordance with embodiments of the present invention. As also shown, plasma densification results in composite particles having a much higher bulk density than the density of the powder after blending or after spray drying. As utilized herein, "bulk density" of a powder corresponds to the collective weight of the particles of the powder divided by the volume occupied by such particles. In various embodiments, plasma-densified composite particles have bulk densities that are within approximately 35% of, within approximately 40% of, within approximately 45% of, within approximately 50% of, within approximately 55% of, within approximately 60% of, or even within approximately 65% of that of the desired alloy. In various embodiments, the bulk density of plasma-densified composite particles is less than approximately 75% of, less than approximately 70% of, or less than approximately 65% of that of the desired alloy.

Plasma densification may also reduce the particle-size distribution of the composite particles, even in the absence of separate particle filtering or classification, as shown in the table above, where a particle-size distribution dX of Y denotes that X% of particles have a size less than Y. In various embodiments, the densified composite particles may have a particle-size distribution d10 between 1 microns and 10 microns, between 2 microns and 8 microns, between 4 microns and 8 microns, or between 5 microns and 7 microns. In various embodiments, the densified composite particles may have a particle-size distribution d50 between 10 microns and 40 microns, between 10 microns and 25 microns, between 15 microns and 40 microns, or between 15 microns and 25 microns. In various embodiments, the densified composite particles may have a particle-size distribution d90 between 40 microns and 80 microns, between 40 microns and 70 microns, between 50 microns and 70 microns, or between 60 microns and 70 microns.

Figure 3A:
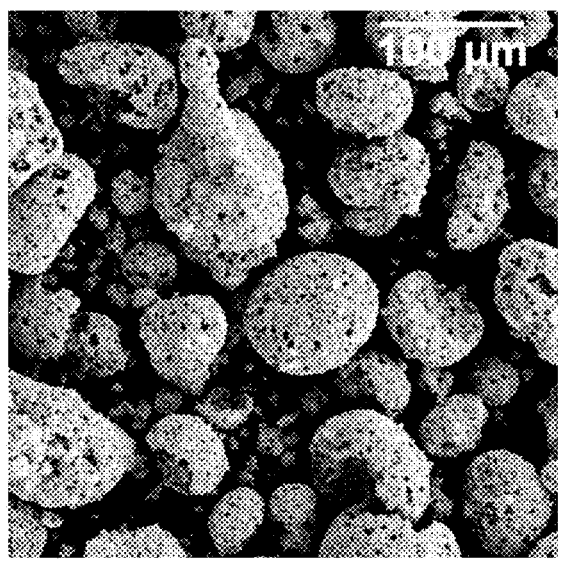
FIG. 3A is a micrograph depicting tungsten heavy alloy agglomerate particles fabricated in accordance with various embodiments of the invention.
Figure 3B:
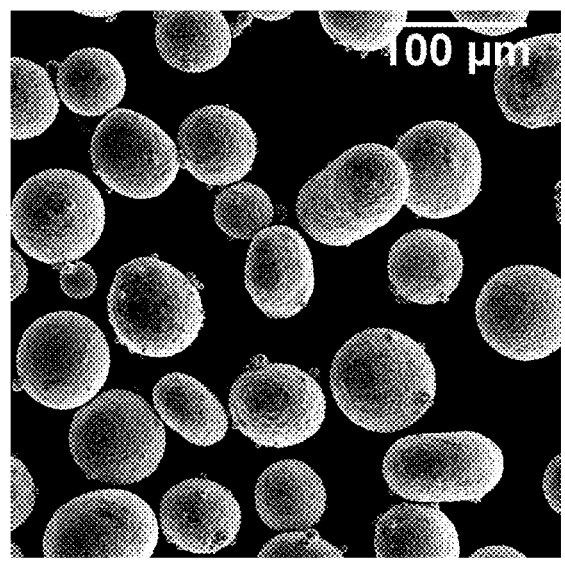
FIG. 3B is a micrograph depicting tungsten heavy alloy densified composite particles fabricated in accordance with various embodiments of the invention.
Figure 4:
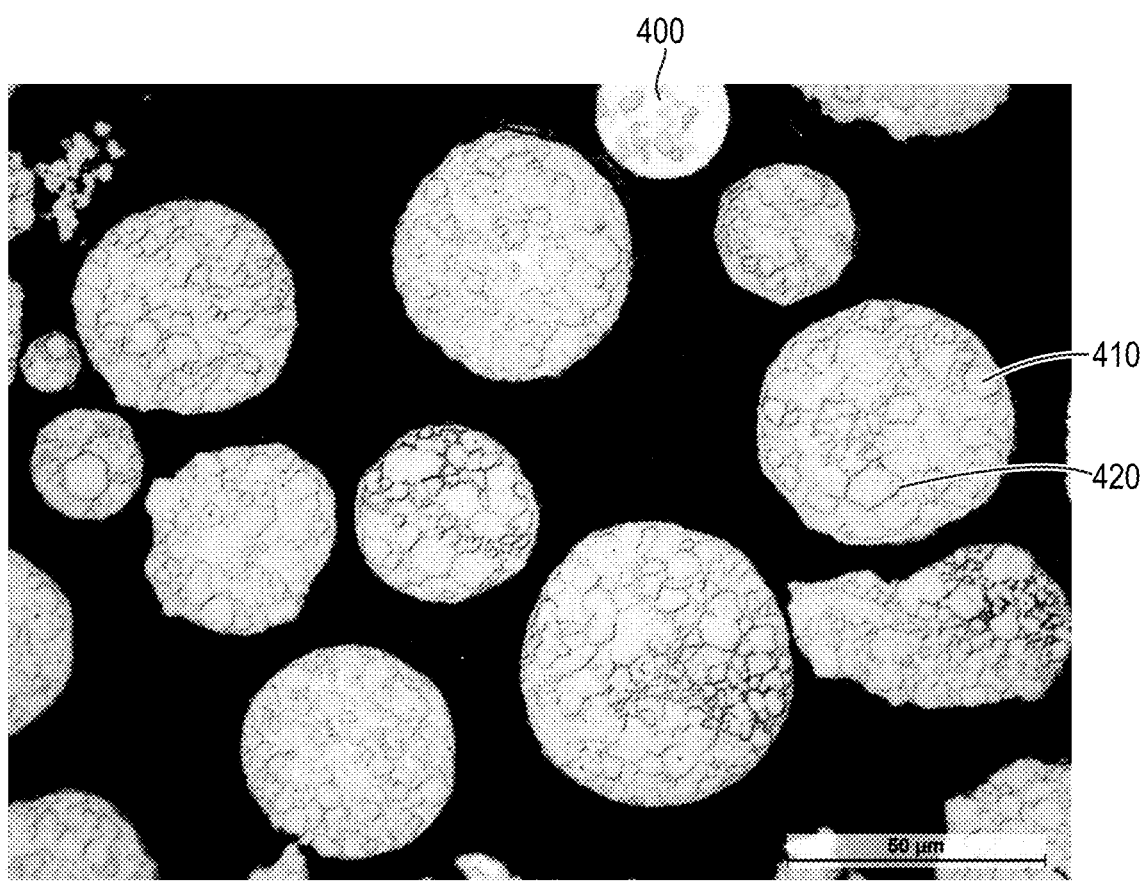
FIG. 4 is a micrograph depicting grain structure of tungsten heavy alloy densified composite particles fabricated in accordance with various embodiments of the invention.

FIG. 3A is a micrograph depicting the spray-dried agglomerate particles described above in relation to the above table, while FIG. 3B is a micrograph depicting the plasma-densified composited particles described above in relation to the above table. As shown, a significant percentage of the agglomerate particles in FIG. 3A are not substantially spherical. In contrast, the densified composite particles are substantially spherical. Furthermore, the densified composite particles appear to be less porous. In addition, as shown in FIG. 4, the densified composite particles 400 each include, consist essentially of, or consist of a collection of tungsten grains 410 that are surrounded by a matrix 420 that includes, consists essentially of, or consists of a mixture or alloy of one or more of (or even all of) the other elements present in the desired tungsten heavy metal alloy —Ni, Fe, and Cu in the depicted example. Since the non-tungsten constituents of tungsten heavy alloys tend to have melting points lower than that of tungsten, they are more susceptible to melting during densification and therefore form the matrix surrounding the higher-melting-point tungsten grains in each of the densified composite particles 400.

Figure 5:
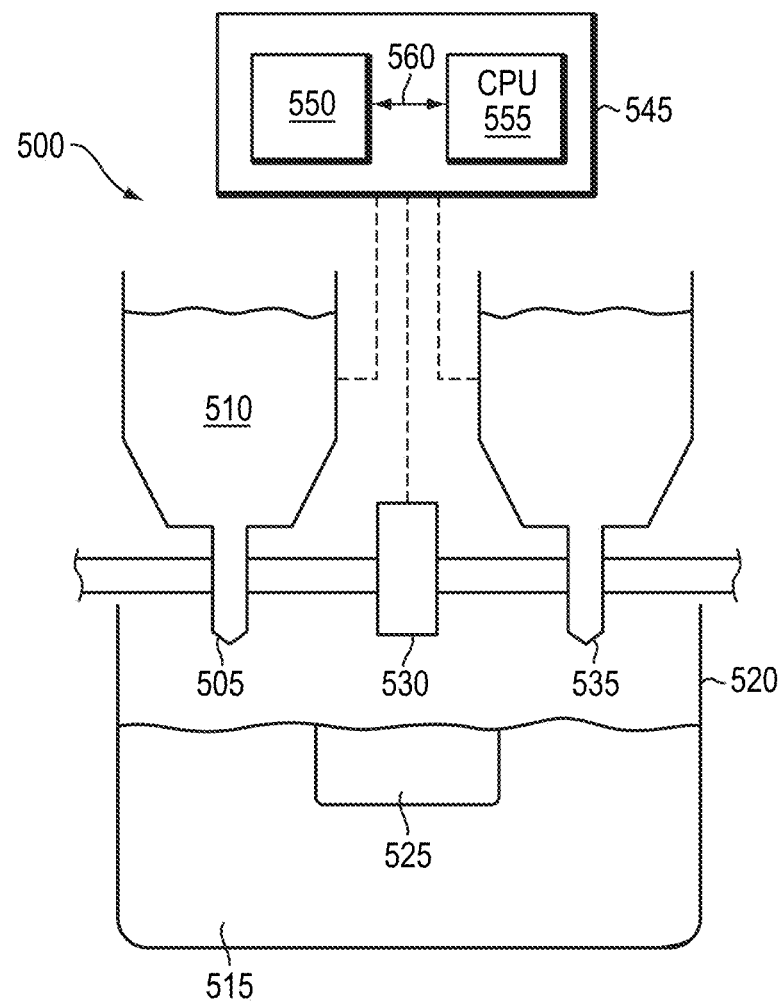
FIG. 5 is a schematic of an additive-manufacturing apparatus utilized to fabricate three-dimensional metallic parts in accordance with various embodiments of the invention.

In accordance with embodiments of the invention, the alloy composite particles (and/or the non-plasma-densified agglomerate particles) are utilized to form a 3D part by additive manufacturing. In an exemplary embodiment, a printing apparatus 500 is utilized to fabricate a part in accordance with embodiments of the invention, as shown in FIG. 5. As shown, a printing head 505 is utilized to disperse a liquid binder or adhesive 510 (which may include, consist essentially of, or consist of, e.g., one or more polymeric materials) into a powder bed 515 that may be contained within a build container 520. The powder bed 515 contains the particles of the desired metal alloy (e.g., densified composite particles and/or spray-dried agglomerate particles), and the printing head 505 disperses the liquid binder layer by layer in approximately the desired shape and size for the final desired part 525 (shown in FIG. 5 as partially defined via dispersal of multiple layers of binder 510 into the powder bed 515). After each layer of the binder 510 is dispersed over the powder bed 515, the layer of binder 510 is typically cured by, e.g., application of heat and/or light (e.g., infrared light or ultraviolet light). For example, a curing head 530 may be moved over the powder bed 515 while emitting heat and/or light onto the layer of binder 510. As such, the curing head 530 may include, consist essentially of, or consist of one or more heaters (e.g., resistive heaters) and/or light sources (e.g., lamps, light-emitting diodes, lasers, etc.). After each layer of the binder 510 is cured, another layer of the powder particles is dispensed into the powder bed 515 over the partially completed part by a powder dispersal head 535, and the process is repeated. After each layer, the powder bed 515 may be translated vertically (i.e., in the "z" direction) relative to the printing head 505, the curing head 530, and the powder dispersal head 535 (i.e., any of the tools and/or the powder bed may be translated) to accommodate the growing part.

The printing head 505, the curing head 530, and the powder dispersal head 535 may move over the powder bed 515 in one, two, or three dimensions. As shown in FIG. 5, these tools may move via a gantry 540 or other framework suspended over the powder bed 515, for example, using one or more motors, actuators, and/or stepper motors. Although FIG. 5 depicts these tools as separate and independently movable, in various embodiments the printing head 505, the curing head 530, and the powder dispersal head 535 are portions of a single unified fabrication head that is movable over the powder bed and dispenses binder, cures the binder, and dispenses powder from different portions thereof. Arrangements enabling the motion of the dispersal and curing tools relative to the powder bed are known in the printing, plotting, and scanning arts and may be provided by one of skill in the art without undue experimentation. In other embodiments, the build container 520 itself may be moved relative to the tools in addition to or instead of one or more of the tools moving. Such relative movement may be controlled by a computer-based controller 545 based on electronically stored representations of the part to be fabricated. For example, the two-dimensional layers traced out by the printing head 505 may be extracted from a stored three-dimensional representation of the final part stored in a memory 550.

The computer-based control system (or "controller") 545 in accordance with embodiments of the present invention may include or consist essentially of a general-purpose computing device in the form of a computer including a processing unit (or "computer processor") 555, the system memory 550, and a system bus 560 that couples various system components including the system memory 550 to the processing unit 555. Computers typically include a variety of computer-readable media that can form part of the system memory 550 and be read by the processing unit 555. By way of example, and not limitation, computer readable media may include computer storage media and/or communication media. The system memory 550 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 555. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, PYTHON, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 555 that executes commands and instructions may be a general-purpose computer processor, but may utilize any of a wide variety of other technologies including special-purpose hardware, a microcomputer, minicomputer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

After the final layer of the binder 510 has been dispersed and cured and printing is complete, the shaped, 3D part is composed of the particles held together by the cured binder material. The shaped part may then be sintered to fuse the particles together and melt away some or all of the binder material and possibly leave empty pores (if desired; such pores may subsequently be infiltrated with another material via, e.g., dispersing the material (e.g., one or more metals) in powder or liquid form on the part and sintering). For example, the part may be sintered for times up to approximately 1 hour, or even longer, and a temperatures ranging from approximately 1200° C. to approximately 1600° C. (e.g., from approximately 1400° C. to approximately 1500° C.). The sintering may be performed at low pressure (e.g., at least partial vacuum) or in a reducing (e.g., hydrogen or hydrogen-containing) atmosphere. The sintering process may also result in densification of the particles and shrinkage of the part, particularly in embodiments in which the particles are not further densified (e.g., by plasma densification) after spray drying. (As detailed herein, the use of densified composite particles for the additive manufacturing process advantageously results in, in various embodiments, reduced or minimal shrinkage of the finished part during any final sintering process.) The sintering may be performed below the melting point of a primary element within the particles and above the melting points of one or more secondary elements within the particles at lesser amounts. For example, in embodiments of the invention in which the 3D part includes, consists essentially of, or consists of a tungsten heavy alloy (or other refractory metal alloy), the sintering may be performed at a temperature approximately equal to or exceeding the melting point of one or more of the non-tungsten (or non-refractory-metal) elements within the alloy and below the melting point of tungsten (or the other refractory metal(s)). Pressure may also be applied to the part during sintering; thus, the part may be sintered within a hot isostatic pressing process. Alternatively or in addition, the part may be cold isostatically pressed or hot isostatically pressed after sintering.

Figure 6:
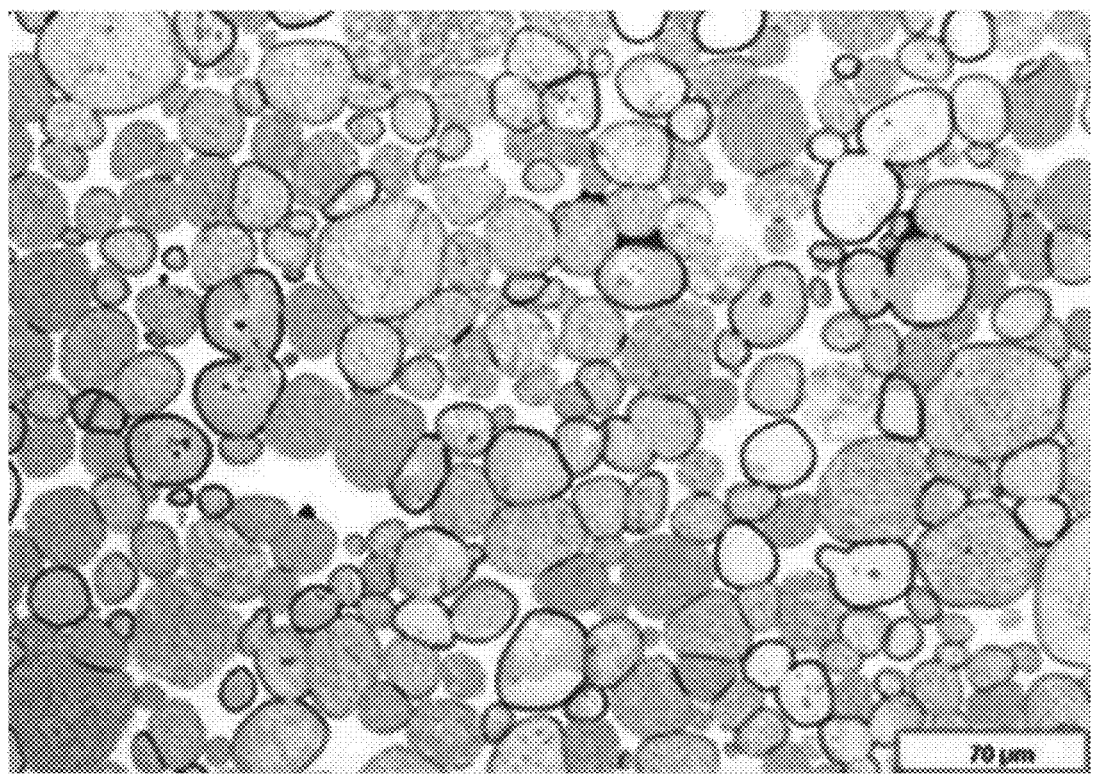
FIG. 6 is a cross-sectional micrograph of a three-dimensional metallic part fabricated from spray-dried agglomerate particles in accordance with various embodiments of the invention.

FIG. 6 depicts a magnified view of part of an object produced by additive manufacturing of spray-dried tungsten heavy alloy agglomerate particles and sintered at approximately 1450° C. for 1 hour in a hydrogen atmosphere, in accordance with an embodiment of the invention. The table below compares various properties of the 3D-printed and sintered part with requirements of a relevant ASTM specification for tungsten heavy alloys (see ASTM B777-07 (2013), Standard Specification for Tungsten Base, High-Density Metal, ASTM International, West Conshohocken, Pa., 2013, the entire disclosure of which is incorporated by reference herein.) As shown, the density and hardness of the part meet the ASTM specification, even though additional densification of the agglomerate particles was not performed before additive manufacturing. The composition of the agglomerate particles was 90% W, 5% Ni, 3% Fe, and 2% Cu.

| Powder Grade | Density (g/cc) | Hardness (HRc) | Shrinkage (%) |
|---|---|---|---|
| ASTM B777 Spec. - Class 1 Blended Material | 16.85-17.25 | 32 max | N/A |
| Spray Dried | 16.94 | 30.1 | 38 |

The table below compares various properties of two other 3D-printed and sintered parts with the same ASTM standard, where these parts were fabricated using tungsten heavy alloy composite particles having two different compositions, Composition A (91% W, 5% Ni, 2.5% Fe, and 1.5% Cu), and Composition B (91.5% W, 6.5% Ni, and 2% Fe), and that were plasma densified prior to additive manufacturing.

|  | Density (g/cc) | Hardness (HRc) | UTS (MPa) | 0.2% Yield Strength (MPa) | Elongation (%) | Shrinkage (%) |
| --- | --- | --- | --- | --- | --- | --- |
| ASTM B777 Spec. - Class 1 Blended Material | 16.85-17.25 | 32 max | 758 min | 517 min | 5 min | 18 |
| Composition A | 17.24 | 27.3 | 770 | 531 | 8.6 | 18-20 |
| Composition B | 17.22 | 24.1 | 878 | 564 | 25.1 | 18-20 |

Figure 7:
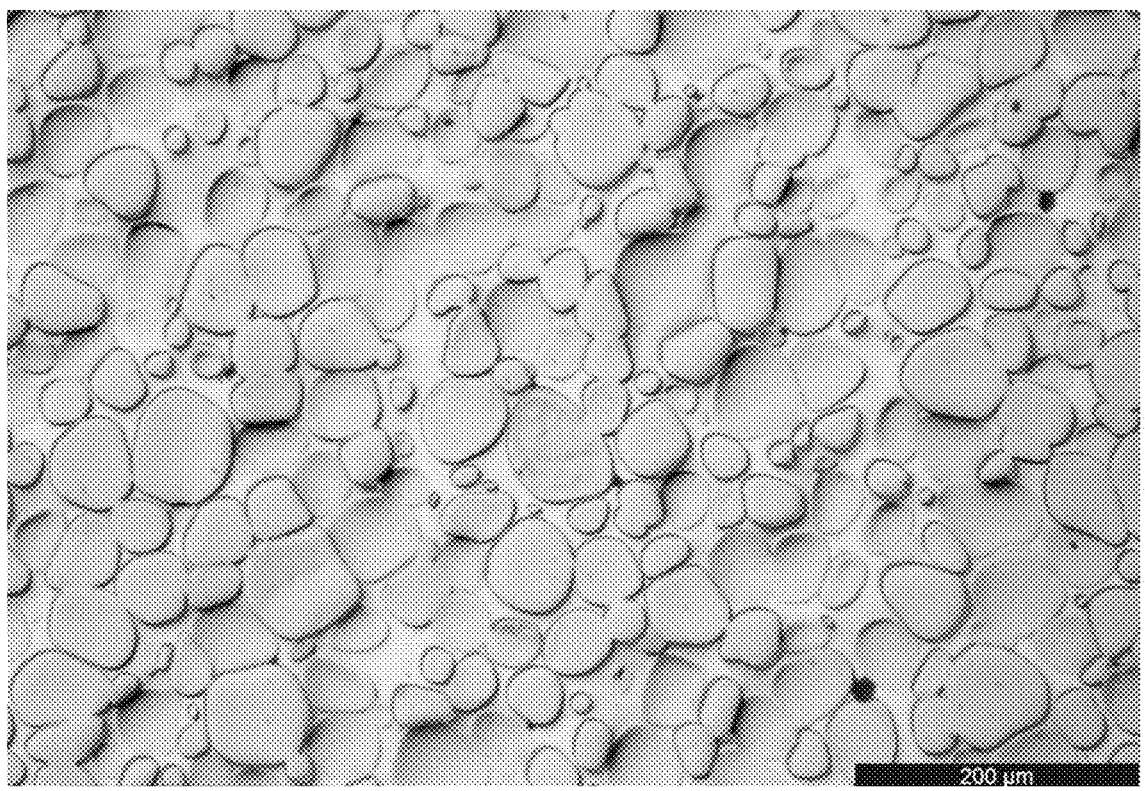
FIG. 7 is a cross-sectional micrograph of a three-dimensional metallic part fabricated from plasma-densified composite particles in accordance with various embodiments of the invention.

The shrinkage of these parts after printing and subsequent sintering was only 18%-20%, compared to the 30%-38% shrinkage resulting in parts printed utilizing agglomerate particles that are spray dried but not plasma densified. As shown in the table, the characteristics of these parts meets or exceeds the relevant ASTM standard. In addition, parts printed utilizing plasma densified composite particles have been found to have higher green strengths than those printed utilizing agglomerate particles that are spray dried but not plasma densified. FIG. 7 shows the microstructure of the printed and sintered part fabricated from the spray dried and plasma densified powder particles having Composition A. The microstructure in FIG. 7 is substantially identical to the microstructure of a tungsten heavy alloy metal part fabricated utilizing conventional powder metallurgy techniques.

In additional embodiments of the invention, the spray-dried agglomerate particles and/or the plasma-densified composite particles are fabricated into a wire that is subsequently utilized as feedstock for additive manufacturing. For example, the agglomerate and/or composite particles may be placed within a tube or a cylindrical mold to form a wire preform. In embodiments utilizing a tube, the tube may include, consist essentially of, or consist of at least one of the elements of the desired alloy (and thus present within the particles), and the tube may become part of the final wire after drawing. In various embodiments, some or all of the particles of the preform are substantially spherical plasma-densified particles as detailed herein. In various embodiments, such substantially spherical particles may be mixed with non-spherical particles to form the preform and, eventually, the wire, as detailed in U.S. patent application Ser. Nos. 15/416,253 and 15/416,254, filed on Jan. 26, 2017, the entire disclosure of each of which is incorporated herein by reference.

In various embodiments, the preform may be further densified before further processing into wire. For example, the preform may be pressed by, e.g., hot isostatic pressing or cold isostatic pressing. After formation of the preform, the preform is processed into a wire. In an exemplary embodiment, the preform is formed into wire via drawing through one or more drawing dies until the diameter of the wire is reduced to the desired dimension. In various embodiments, the drawing is supplemented with or replaced by one or more other mechanical deformation processes that reduce the diameter (or other lateral dimension) of the preform, e.g., pilgering, rolling, swaging, extrusion, etc. The preform and/or wire may be annealed during and/or after diameter reduction (e.g., drawing).

In various embodiments, the preform is formed of the agglomerate and/or composite particles within a tube that includes, consists essentially of, or consists of one or more of the elements of the desired metal alloy (e.g., a refractory metal alloy such as a tungsten heavy alloy). The tube may itself be coaxially disposed within one or more other tubes that include, consist essentially of, or consist of one or more other elements of the alloy. When the preform containing the one or more tubes is drawn down into wire, the cross-section of the wire will thus include all of the elemental constituents of the desired alloy. In various embodiments, at least a portion of the powder particles may be further densified before being placed into the tube(s). For example, the powder particles may be pressed by, e.g., hot isostatic pressing or cold isostatic pressing.

In various embodiments, the one or more tubes may include, consist essentially of, or consist of one or more elements that are more ductile than one or more of the elements present in powder form. For example, the one or more tubes may include, consist essentially of, or consist of Nb, Ta, Ti, and/or Zr. In other embodiments, the one or more tubes may include, consist essentially of, or consist of one or more of the non-refractory-metal elements in the desired alloy (e.g., one or more transition metals). In various embodiments, the one or more tubes have a sufficiently small diameter that the preform itself may be utilized as the final wire without further processing or diameter reduction such as wire drawing. In various embodiments, the one or more tubes, with the particles therewithin, may be annealed and/or subjected to pressure (e.g., hot-isostatically pressed) before (or between multiple steps of) the process of diameter reduction. Such treatment may advantageously reduce void space within and increase the density of the final wire.

In other embodiments, the preform may feature a sacrificial tube in which the particles are disposed. After processing of the preform into wire, the sacrificial tube may be etched or melted away, and the final wire includes, consists essentially of, or consists of the elements of the desired alloy arising solely from the original particles. In various embodiments, one or more tubes to be processed as part of the wire may be disposed within the sacrificial tube; at least portions of such tubes will typically remain as portions of the wire after removal of the sacrificial tube. The sacrificial tube may include, consist essentially of, or consist of, for example, plastic, rubber, one or more polymeric materials, a metallic material having a melting point lower than one or more (or even all) of the metallic elements within the particles, a metallic material selectively etchable (i.e., over the metallic elements within the particles and other tubes), etc.

Figure 8:
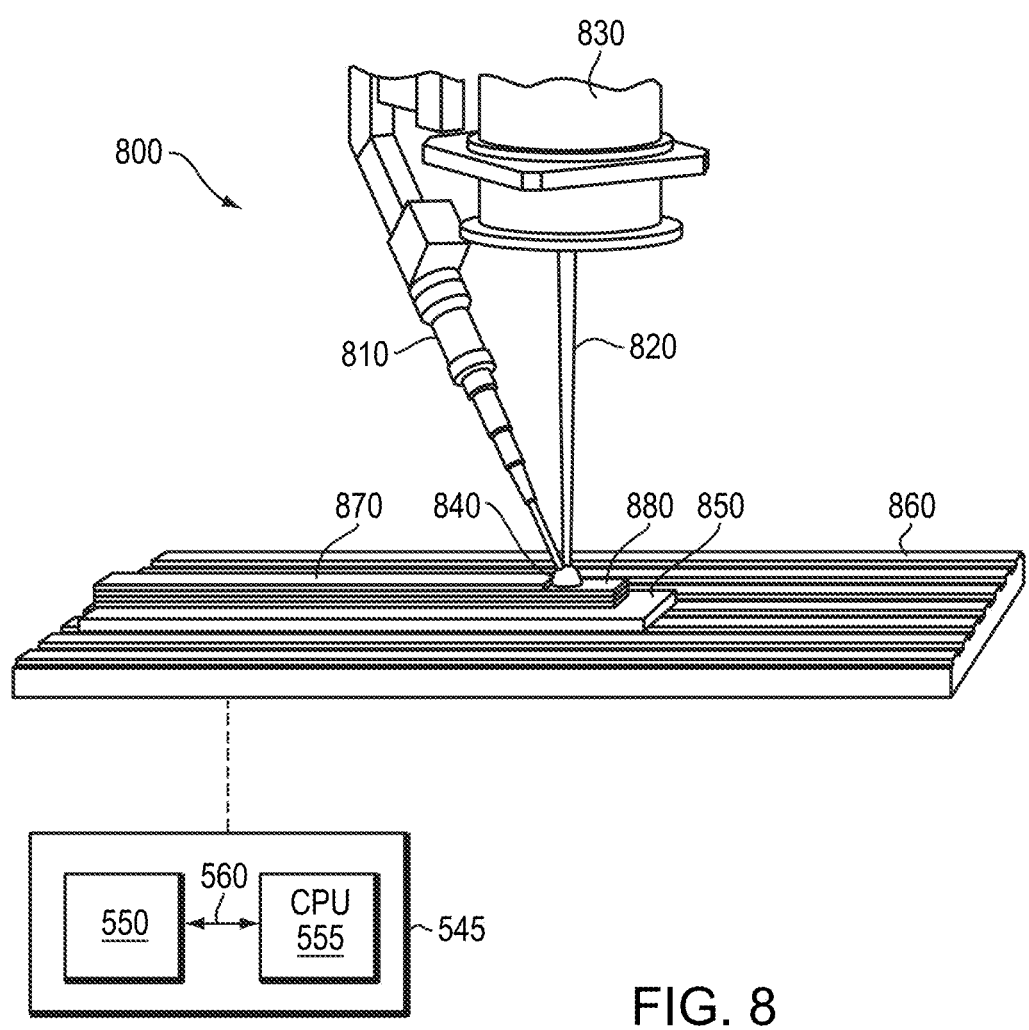
FIG. 8 is a schematic of an additive-manufacturing apparatus utilized to fabricate three-dimensional metallic parts in accordance with various embodiments of the invention.

Once the wire including, consisting essentially of, or consisting of the desired alloy (e.g., a tungsten heavy alloy or other refractory-metal alloy) is fabricated in accordance with embodiments of the invention, the wire may be utilized to fabricate a three-dimensional part with an additive manufacturing assembly 800. For example, as shown in FIG. 8, the wire may be incrementally fed, using a wire feeder 810, into the path of a high-energy source 820 (e.g., an electron beam or a laser beam emitted by a laser or electron-beam source 830), which melts the tip of the wire to form a small molten pool (or "bead" or "puddle") 840. The entire assembly 800 may be disposed within a vacuum chamber to prevent or substantially reduce contamination from the ambient environment.

Relative movement between a substrate 850 (which may be, as shown, disposed on a platform 860) supporting the deposit and the wire/gun assembly results in the part being fabricated in a layer-by-layer fashion. Such relative motion results in the continuous formation of a layer 870 of the three-dimensional object from continuous formation of molten pool 840 at the tip of the wire. As shown in FIG. 8, all or a portion of layer 870 may be formed over one or more previously formed layers 880. The relative movement (i.e., movement of the platform 860, the wire/gun assembly, or both) may be controlled by computer-based controller 545 based on electronically stored representations of the part to be fabricated. For example, the two-dimensional layers traced out by the melting wire may be extracted from a stored three-dimensional representation of the final part stored in memory 550. After the additive manufacturing process is complete, the part may be removed from the platform and subjected to final machining and/or polishing.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of forming a powder comprising a refractory metal alloy, wherein the refractory metal alloy (i) comprises (a) one or more refractory metals selected from the group consisting of niobium, tantalum, rhenium, tungsten, and molybdenum, and (b) one or more additional metals each having a melting point lower than a melting point of each said refractory metal, and (ii) has a theoretical density corresponding to a weighted average of the densities of the one or more refractory metals and the one or more additional metals, the method comprising:
    forming a powder blend by blending together powders of the one or more refractory metals and the one or more additional metals;
    forming a slurry by mixing the powder blend with a liquid;
    spraying the slurry and a heated gas into a drying chamber to form a plurality of agglomerate particles each comprising a mixture of the one or more refractory metals and the one or more additional metals; and
    to form the powder, densifying at least a portion of the plurality of agglomerate particles by passing the at least a portion of the plurality of agglomerate particles through a plasma to thereby heat the at least a portion of the plurality of agglomerate particles to a temperature greater than a melting point of at least one of the additional metals and less than a melting point of at least one of the refractory metals,
    wherein the powder comprises a plurality of substantially spherical composite particles, each composite particle comprising a plurality of grains (i) comprising at least one said refractory metal element and (ii) surrounded by a matrix comprising the one or more additional metals.

2. The method of claim 1, wherein the liquid comprises water and/or one or more organic binders.

3. The method of claim 1, wherein the at least a portion of the plurality of agglomerate particles is heated to a temperature greater than a melting point of each of the additional metals.

4. The method of claim 1, wherein at least one said additional metal comprises a transition metal.

5. The method of claim 1, wherein at least one said additional metal is selected from the group consisting of copper, cobalt, nickel, iron, manganese, silver, gold, cadmium, vanadium, palladium, zirconium, and yttrium.

6. The method of claim 1, wherein a Hall flow rate of the powder ranges from approximately 1 s/50 g to approximately 15 s/50 g.

7. The method of claim 1, wherein the powder has a particle-size distribution d10 between 2 microns and 8 microns, d50 between 15 microns and 25 microns, and d90 between 50 microns and 70 microns, wherein a particle-size distribution dX of Y denotes that X% of particles have a size less than Y.

8. The method of claim 1, wherein the bulk density of the powder is approximately 45% or more of the theoretical density.

9. The method of claim 1, wherein the bulk density of the powder is approximately 65% or less of the theoretical density.

10. The method of claim 1, further comprising disposing at least a some of the composite particles within a powder bed of an additive manufacturing apparatus.

11. The method of claim 10, further comprising, with the additive manufacturing apparatus:
    forming a first layer of a shaped part by (i) dispersing a binder into the powder bed, and (ii) curing the binder, the first layer of the shaped part comprising composite particles bound together by cured binder;
    disposing a layer of the composite particles over the first layer of the shaped part; and
    forming subsequent layers of the shaped part by (i) dispersing binder over the composite particles, and (ii) curing the binder, additional composite particles being disposed over the shaped part between layers.

12. The method of claim 11, further comprising sintering the shaped part.

13. The method of claim 12, wherein the shaped part is sintered in a hydrogen-containing atmosphere.

14. The method of claim 12, wherein the shaped part is sintered at a temperature ranging between approximately 1400° C. and approximately 1500° C.

15. The method of claim 11, wherein, during formation of each layer of the shaped part, the binder is cured via application of at least one of light or heat.

16. The method of claim 1, further comprising fabricating a wire from the powder.

17. The method of claim 16, wherein fabricating the wire comprises:
    placing the powder in a tube or a mold to form a wire preform; and
    reducing a diameter of the wire preform to form the wire.

18. The method of claim 17, wherein the tube comprises one of the elements present in the powder, and the tube forms a portion of the wire after the diameter of the wire preform is reduced.

19. The method of claim 17, wherein the tube comprises an element not present in the powder, and the tube forms a portion of the wire after the diameter of the wire preform is reduced.

20. The method of claim 17, wherein the tube comprises a sacrificial tube, and further comprising removing the sacrificial tube after the wire is formed.

21. The method of claim 1, wherein a concentration, within the powder, of at least one of sodium, magnesium, phosphorus, sulfur, potassium, calcium, or antimony is less than 10 ppm.

* * * * *